(12) United States Patent
Harney et al.

(10) Patent No.: US 7,254,336 B2
(45) Date of Patent: Aug. 7, 2007

(54) METHOD OF SEAMLESS MIGRATION FROM SCALEABLE OADM TO A NETWORK SWITCHING NODE

(75) Inventors: Gordon Harney, Ottawa (CA); Jonathan Bosloy, Kanata (CA); Hanan Anis, Kanata (CA); Reza Paiam, Ottawa (CA); John Gruber, Orleans (CA)

(73) Assignee: Altera Corporation, San Jose, CA (US)

( * ) Notice: Subject to any disclaimer, the term of this patent is extended or adjusted under 35 U.S.C. 154(b) by 997 days.

(21) Appl. No.: 10/348,818

(22) Filed: Jan. 22, 2003

(65) Prior Publication Data

US 2003/0175029 A1    Sep. 18, 2003

Related U.S. Application Data

(63) Continuation-in-part of application No. 10/054,775, filed on Jan. 23, 2002, now Pat. No. 6,999,681.

(51) Int. Cl.
*H04J 14/02* (2006.01)

(52) U.S. Cl. .......................................... 398/83; 398/50

(58) Field of Classification Search ............ 398/48–51, 398/83–85
See application file for complete search history.

(56) References Cited

U.S. PATENT DOCUMENTS 5,557,439 A * 9/1996 Alexander et al. ............ 398/87
6,272,154 B1   8/2001 Bala et al.
6,538,784 B1 * 3/2003 Lee et al. ...................... 398/82
2003/0128985 A1 * 7/2003 Elbers et al. .................. 398/83

FOREIGN PATENT DOCUMENTS

| EP | 0 905 936 A2 | 3/1999 |
| EP | 1 081 880 A1 | 3/2001 |
| WO | WO 211489 A2 * | 2/2002 |

OTHER PUBLICATIONS

PCT International Search Report PCT/IB 03/00154, May 23, 2003.

* cited by examiner

*Primary Examiner*—Christina Leung
(74) *Attorney, Agent, or Firm*—Harness, Dickey & Pierce, P.L.C.

(57) ABSTRACT

A method is provided for seamless migration from a scaleable optical add/drop multiplexer to a network switching node in an optical transport network. The method includes: providing a pre-deployed optical add/drop multiplexer (OADM) at a network node in the optical transport network; introducing an additional optical add/drop multiplexer (OADM) at the network node; and interconnecting the pre-deployed OADM to the additional OADM using a photonic cross-connect switch, where the photonic cross-connect switch is operable to route optical signals amongst the optical transport lines connected to the pre-deployed OADM and the upgraded OADM.

7 Claims, 21 Drawing Sheets

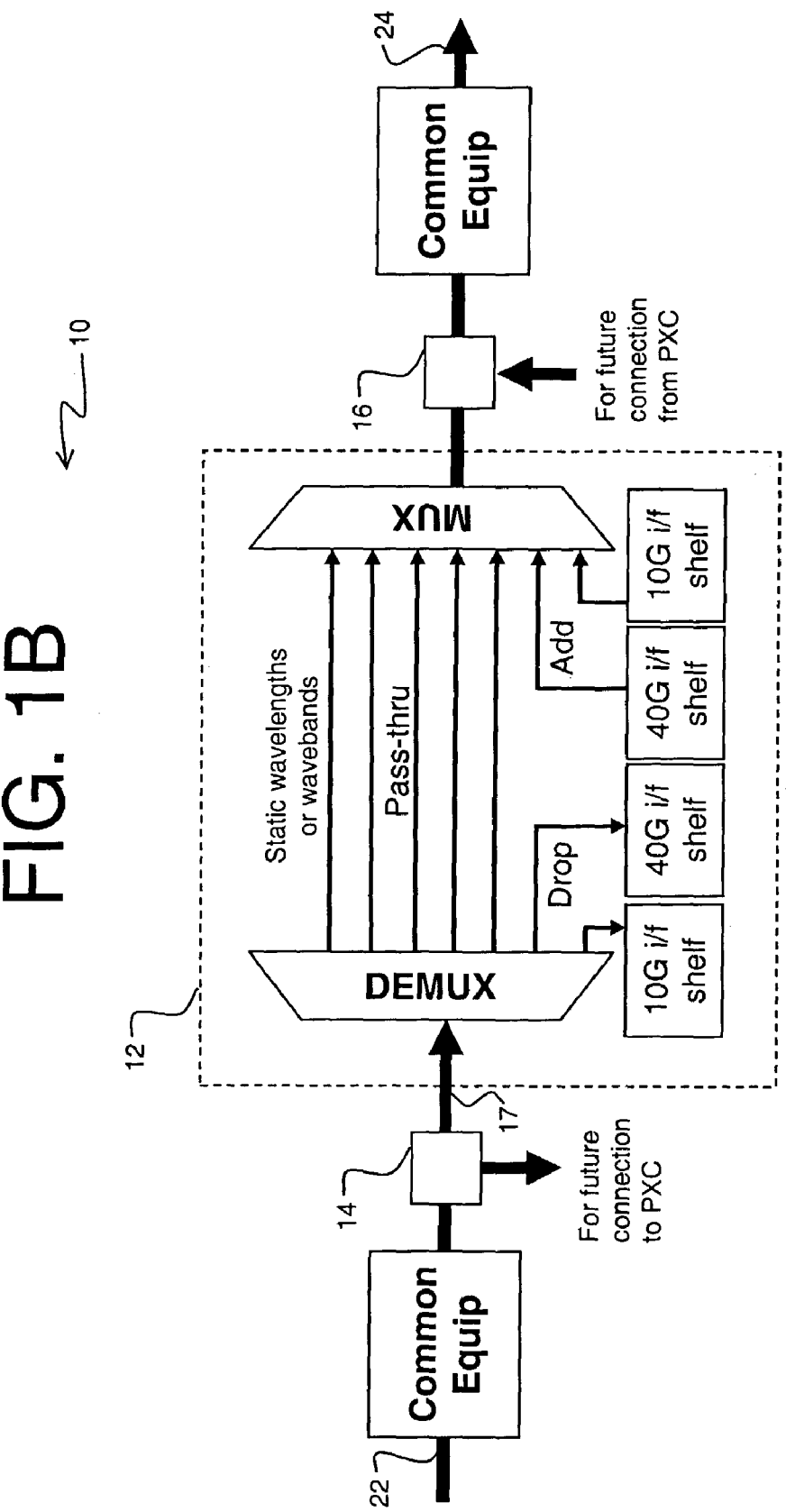

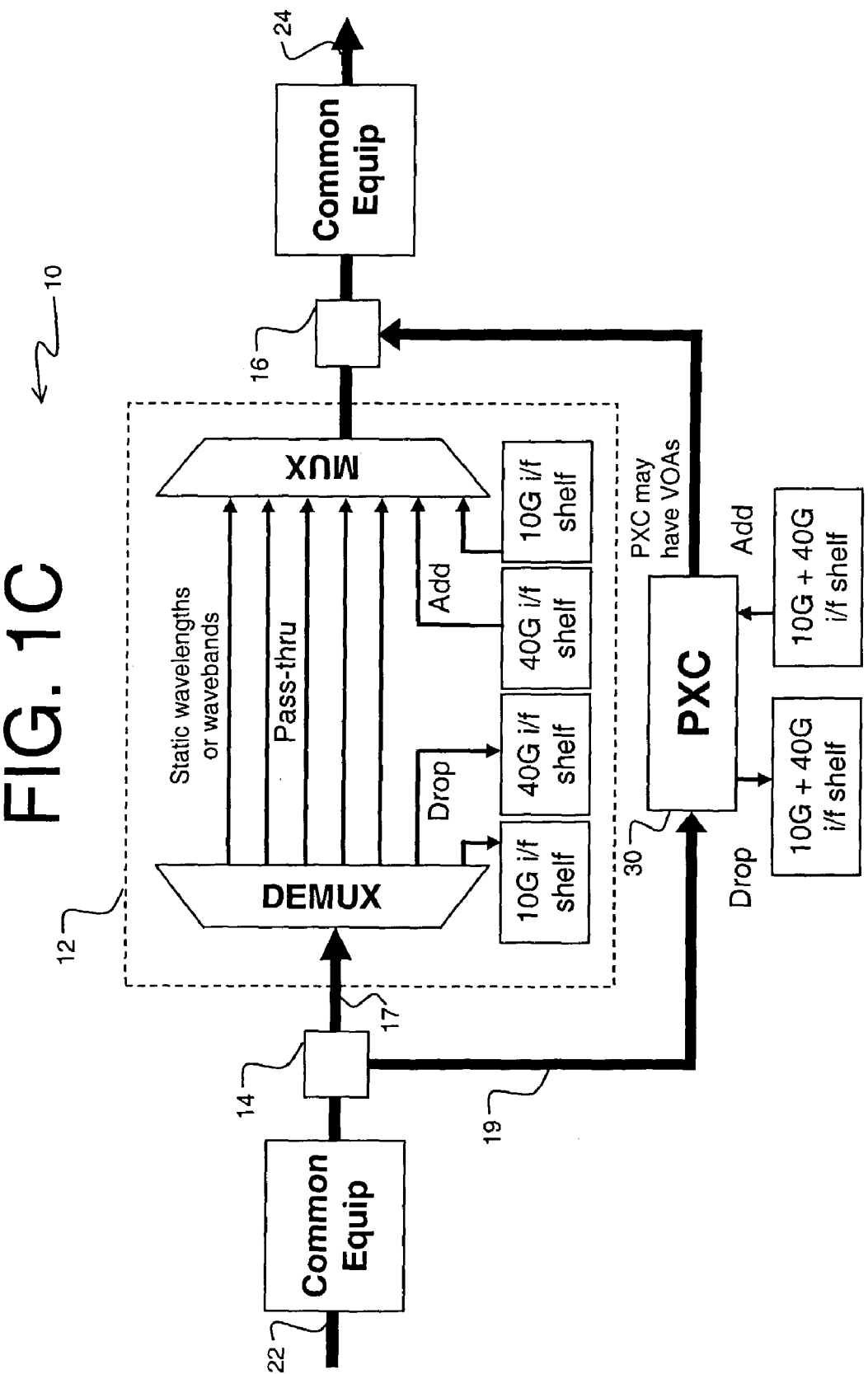

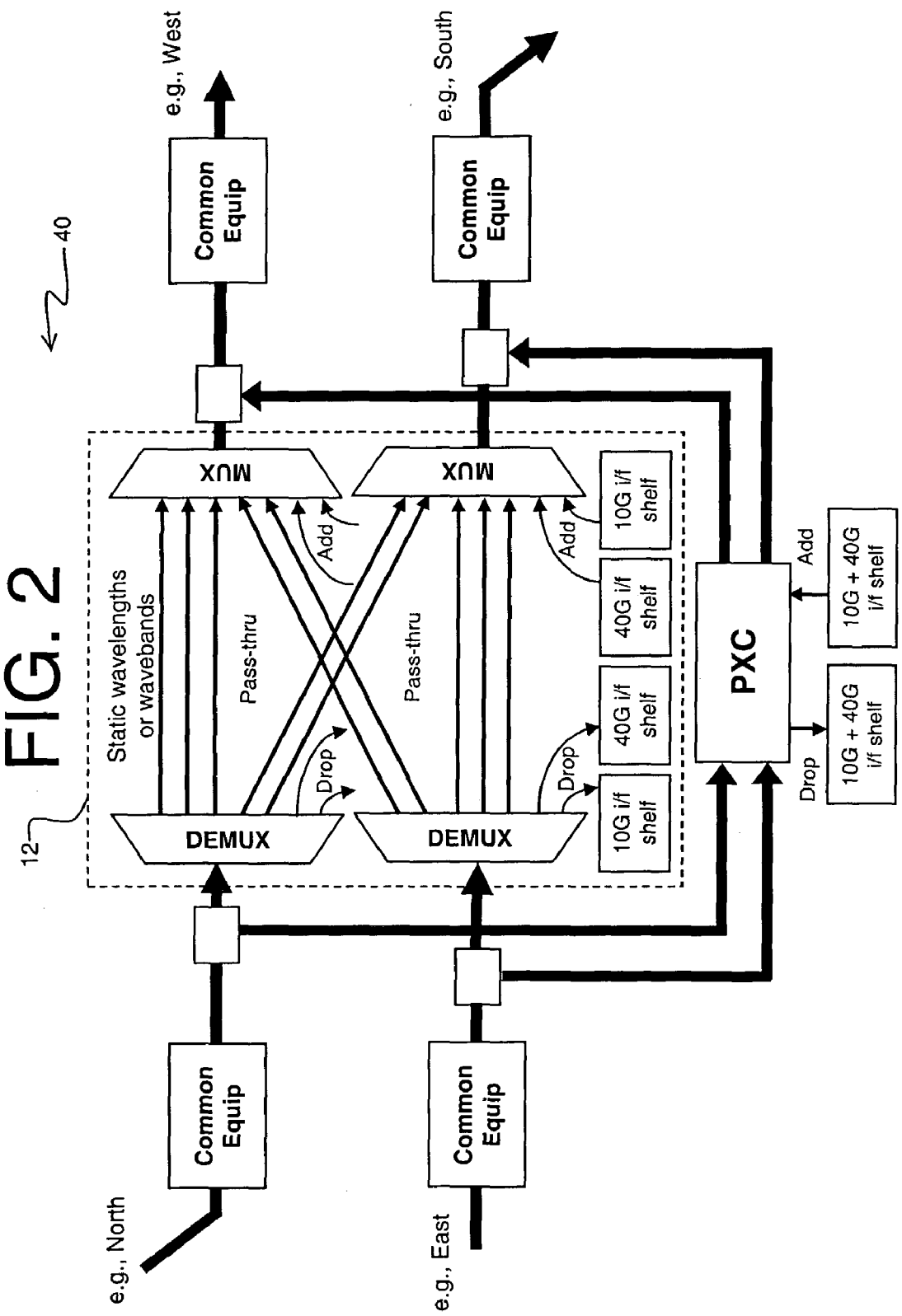

METHOD OF SEAMLESS MIGRATION FROM SCALEABLE OADM TO A NETWORK SWITCHING NODE

FIELD OF THE INVENTION

The present invention relates generally to photonic switching in optical transport networks and, more particularly, to a method of seamless migration from a scaleable optical add/drop multiplexer to network switching node.

BACKGROUND OF THE INVENTION

Connections through current optical networks are either manually provisioned and remain static, and/or use electrical cross-connect switches for more automated provisioning and flexible connectivity.

Static connections are appropriate for services that are unlikely to change, and include the advantage of lowest possible loss. For high capacity networks, static connections can be rapidly provisioned into pre-planned end-to-end bands of wavelengths. For example, a wavelength division multiplexing (WDM) system may support the photonic routing of wavelengths in a group rather than individually, the group being called a waveband. An example size for a waveband is eight wavelengths. Once a waveband has been set up across the network, new wavelengths can be quickly added at the two endpoints of the previously established waveband without having to modify the network core. In this case, connections are agile at the network edge, while still static in the network core. There is also a need for connections not only edge agile, but core agile as well. Core network agility can be provided through the use of electrical cross-connect switches. However, this approach has the disadvantage of introducing numerous optical-electrical-optical conversion devices and related costs into the network. Photonic switching enables an agile optical layer, providing remote re-configuration and automated restoration.

Therefore, it is desirable to provide agility by means of photonic switching, and seamless techniques for supporting static and agile services in optical networks.

SUMMARY OF THE INVENTION

In accordance with the present invention, a method is provided for seamless migration from static to agile optical networking at a network switching node in an optical transport network. The seamless method includes: providing an optical signal splitter at the input of the network switching node, the signal splitter being adapted to receive an optical multiplexed signal having a plurality of data signals and at least one data signal being agile; providing an optical signal combiner at the output of the network switching node; and introducing a photonic cross-connect switch between the signal splitter and the signal combiner, where the photonic switch is operable to switch the agile data signals.

In another aspect of the present invention, a method is provided for seamless migration from a scaleable optical add/drop multiplexer to a network switching node in an optical transport network. The method includes: providing a pre-deployed optical add/drop multiplexer (OADM) at a network node in the optical transport network; introducing an additional optical add/drop multiplexer (OADM) at the network node; and interconnecting the pre-deployed OADM to the additional OADM using a photonic cross-connect switch, where the photonic cross-connect switch is operable to route optical signals amongst the optical transport lines connected to the pre-deployed OADM and the additional OADM.

For a more complete understanding of the invention, its objects and advantages, reference may be had to the following specification and to the accompanying drawings.

BRIEF DESCRIPTION OF THE DRAWINGS

FIGS. 1A-1C are block diagrams illustrating a first preferred technique for in-service migration from static optical networking to static plus agile optical networking in accordance with the present invention;

FIG. 2 is a block diagram illustrating how the in-service migration technique may be applied to a switching node that supports four fiber pairs which carry a mix of static and agile connections;

DETAILED DESCRIPTION OF THE PREFERRED EMBODIMENTS

Figure 1A:
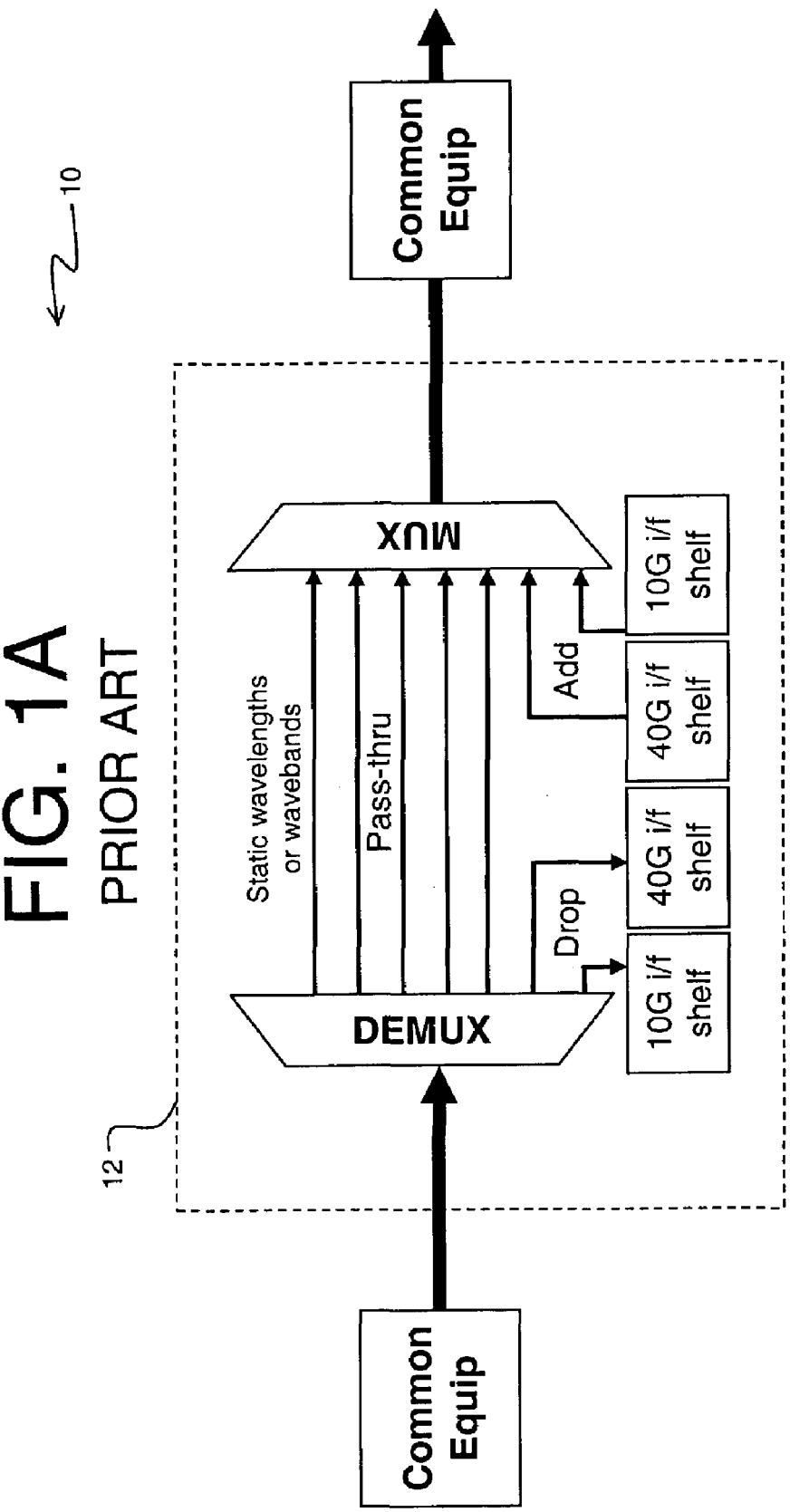

A seamless technique for in-service migration from static optical networking to static plus agile optical networking is depicted in FIGS. 1A-1C. Agile optical networking is generally achieved through the introduction of photonic switching at a network switching node 10, where the switching node 10 interconnects at least two optical transport line systems. The optical transport line systems may employ a pair of unidirectional optical fibers (also referred to as fiber pairs) or a single bi-directional optical fiber. Referring to FIG. 1A, the exemplary network switching node 10 is shown as a fixed optical add/drop multiplexer 12. However, it is envisioned that this technique may be applied to other initial network arrangements residing in a core optical network.

In a WDM optical transport network, numerous optical data signals are multiplexed together to form a single optical system signal. The optical system signal may be constituted in an optical line hierarchy as is known in the art. For example, the optical system signal may be constructed from a plurality of optical band signals, where each of the optical band signals is constructed from a plurality of optical waveband signals and each of the optical waveband signals are constructed from a plurality of optical wavelength signals. Although the fixed optical add/drop multiplexer 12 preferably operates to add, drop, manually route, or otherwise manipulate optical wavelength signals, it is readily understood that the multiplexer may support optical data signals at any one of the hierarchical layers that form an optical system signal. Optical band signals and optical waveband signals are herein referred to as optical multiplexed signals.

In-service migration is enabled by a properly terminated optical splitter 14 located at the node input and a properly terminated optical combiner 16 located at the node output as shown in FIG. 1B. The optical splitter 14 receives an optical multiplexed signal from a first optical transport line 22. The optical splitter 14 in turn splits the optical multiplexed signal into two (or more) optical multiplexed signals as is well known in the art.

The fixed optical add/drop multiplexer 12 receives one of the optical multiplexed signals 17 from the signal splitter 14. The optical multiplexed signal 17 embodies a plurality of data signals. In accordance with the present invention, the optical multiplexed signal includes (or will include) at least one agile data signal (also referred to as an agile connection). The remaining data signals (or connections) are configured statically within the fixed optical add/drop multiplexer 12. The fixed optical add/drop multiplexer 12 enables manual connection of static data signals.

A photonic cross-connect switch 30 may be subsequently introduced between the signal splitter 14 and the signal combiner 16 as shown in FIG. 1C. Specifically, the photonic switch 30 receives a second optical multiplexed signal 19 from the signal splitter 14. The photonic switch 30 can then switch or otherwise process the agile data signals. At introduction, the photonic switch 30 initially blocks (or disables) all of the data signals received. The photonic switch 30 then enables agile data signals as they materialize.

A signal combiner 16 receives optical multiplexed signals from both the optical multiplexer 12 and the photonic switch 30. The signal combiner 16 in turn combines the two optical multiplexed signals to form a single optical multiplexed signal. The optical multiplexed signal may then be launched into a second optical transport line 24. In this way, a seamless technique is provided for in-service migration from static optical networking to static plus agile optical networking. For simplicity, only one direction of transmission has been described. However, it is readily understood that the switching node is ordinarily configured to support bi-directional traffic, meaning another mirror image system for the other direction.

New agile service connections are introduced through the add/drop side of the photonic switch 30. At switching nodes with no agile add/drop service connections, the photonic switch 30 is not essential, but can still be deployed to enable more flexible network reconfiguration and restoration of agile service connections that pass through the switching node. Thus, agile pass through traffic growth is inherent, and agile add/drop traffic growth is 'pay-as-you-go' in terms of as required additional local agile service interfaces.

Implementation of this in-service migration requires adequate isolation between the static and agile network traffic. It is envisioned that isolation may be increased by variable optical attenuators (VOAs) that further suppress static connections at the output of the photonic switch 30. Additional isolation techniques are described below. In any case, the optical transport system must be able to tolerate any limitations on isolation of blocked static connections through the photonic switch which will combine with static connections at the signal combiner. Similarly, the optical transport system must be able to tolerate any noise in unused static connections which will combine with agile connections at the signal combiner. Lastly, optical losses introduced by the optical splitter and combiner are nominally 3 dB per branch, but may differ depending on loss tolerance of static and agile paths. These losses may be cancelled by common equipment amplifiers with negligible optical signal-to-noise ratio (OSNR) impairments.

FIG. 2 illustrates in-service migration for a switching node 40 that supports four fiber pairs, where the additional fiber pairs may carry a mix of static and agile connections. In this case, the switching node, including the photonic switch, is initially configured to support up to four fiber pairs. When less than four fiber pairs are connected to the switching node, additional fiber pairs can be subsequently added in a non-disruptive manner. Depending on the scalability of the photonic switch, one skilled in the art will readily recognize that this arrangement is further extendable to switching nodes that support more or less than four fiber pairs.

Figure 3:
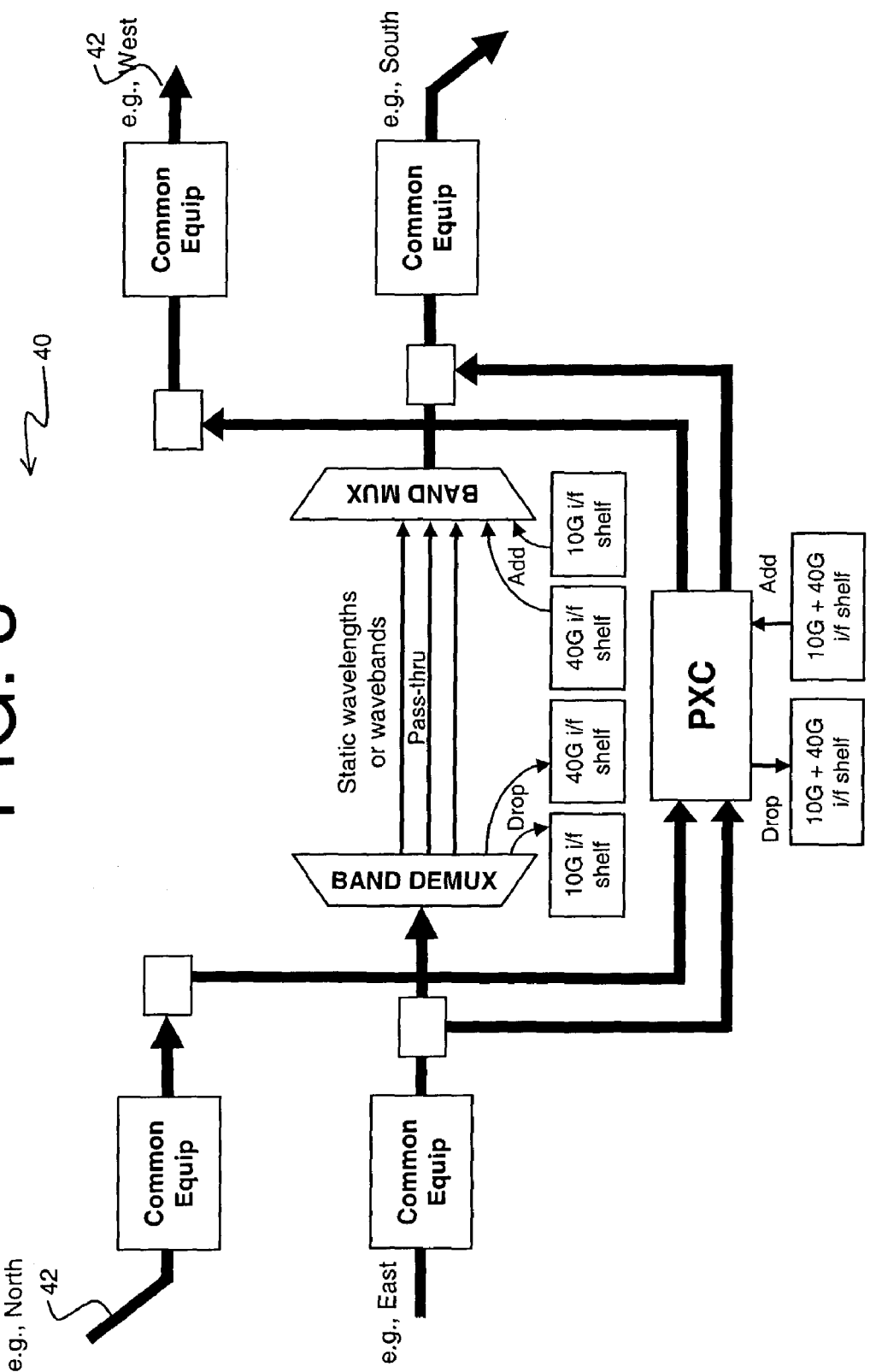
FIGS. 3 and 4 are block diagrams illustrating how the in-service migration technique may be applied to a switching node that supports the addition of at least one fiber pair that carries all static and/or all agile connections.
Figure 4:
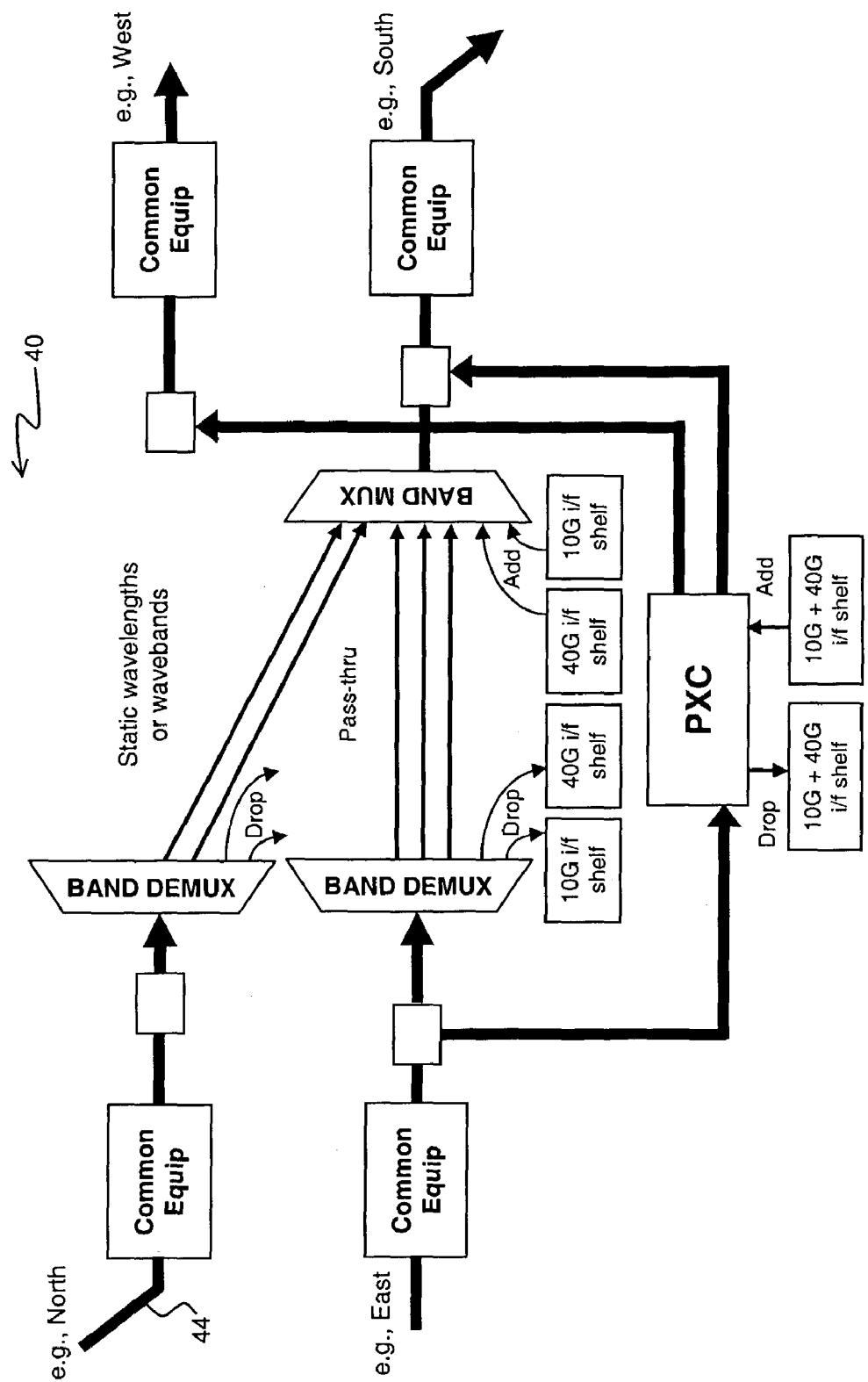

When the additional fiber pairs 42 carry all agile connections, there is no need for corresponding multiplexers and demultiplexers within the context of the fixed optical add/drop multiplexer as shown in FIG. 3. However, multiplexers and/or demultiplexers may be non-disruptively added later if static traffic materializes. Similarly, when the additional fiber pair 44 carries all static connections, there is no need for a connection to the photonic switch as shown in FIG. 4. Again, multiplexers, demultiplexers and/or switch connections may be non-disruptively added later if previously unexpected static and/or agile traffic materializes.

Figure 5:
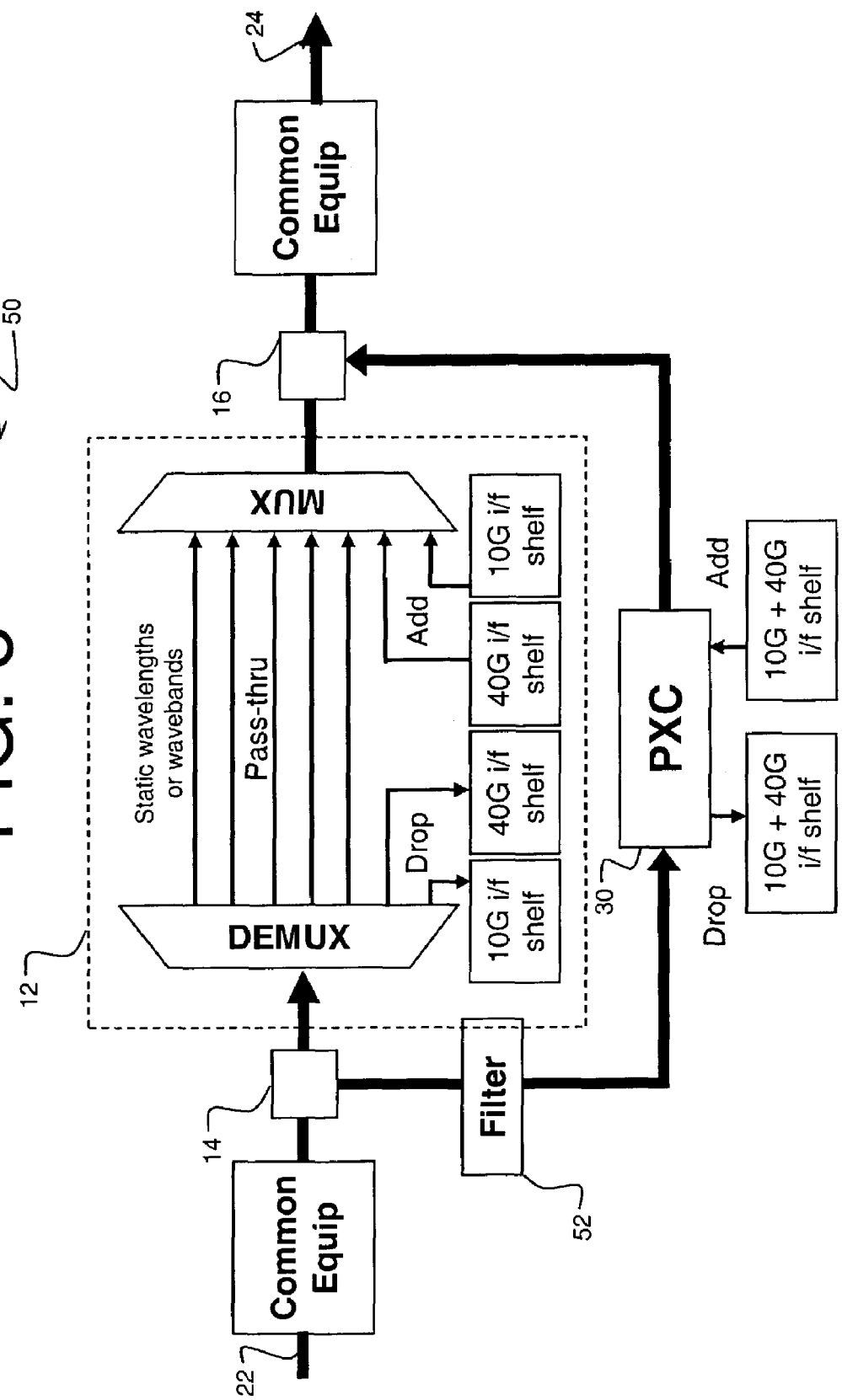
FIG. 5 is a block diagram that illustrates a technique for improving isolation in the switching node in accordance with the present invention.

FIG. 5 illustrates an additional technique for improving isolation in the switching node. This technique introduces a pre-switch filter 52 to improve isolation of blocked static connections through the photonic switch. The filter is located between the signal splitter 14 and the photonic switch 30. The filter 52 rejects static data signals and passes agile data signals to the photonic switch 30. The switching node otherwise operates as described above.

Figure 6:
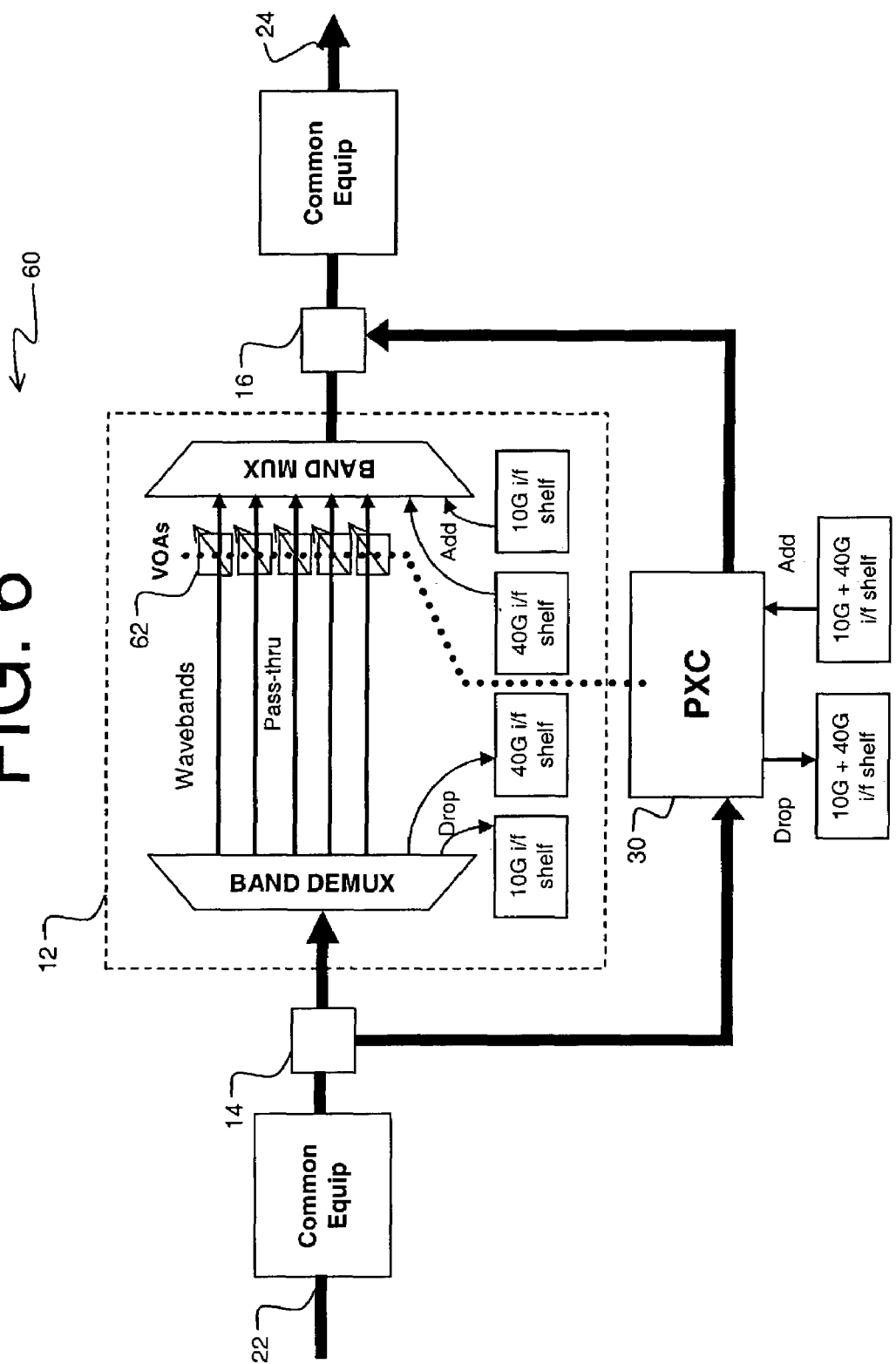
FIGS. 6 and 7 are block diagrams illustrating how unused static bandwidth can be recovered, by either VOAs or switches, for use by the agile connections of the switching node in accordance with the present invention.

In the case of an optical waveband architecture, it is further envisioned that unused static bandwidth can be recovered for use by the agile connections as shown in FIG. 6. In general, selected pass-through wavebands are 'rolled' to the photonic switch 30 for higher fill. Preferably, one waveband is rolled at a time with subsequent verification testing. After the 'roll', the pass-through patch cords for the corresponding waveband can be removed from the multiplexer 12. This prevents interference between static and agile pass through connections as well as prevents any noise in unused static connections from combining with corresponding agile connections at the signal combiner 16.

More specifically, a plurality of variable optical attenuators (VOAs) 62 are inserted into the static connections of the fixed optical add/drop multiplexer 12. The photonic switch 30 initially blocks all static connections and enables all agile connections. To recover unused static bandwidth in a waveband, the preferred approach employs local control as described below. First, the corresponding VOA ramps down the selected waveband power to as low as possible and at a slow rate that is non-disruptive to any other connections. The photonic switch 30 then enables all static connections in this waveband to pass through the switch. A photonic switch equipped with VOAs would ramp-up all static connections in the waveband to the correct power level and at a slow rate that is non-disruptive to any other connections. Unused bandwidth in this waveband can then be used for agile connections. As will be apparent to one skilled in the art, this approach causes a brief disruption to the static connections being rolled, but does not affect the other connections. The slow power ramp down and power ramp up is optional, and depends on the requirements of the downstream optical network. It is not required if the downstream network can handle the transients resulting from a fast roll-over. For example, certain semiconductor-based "linear optical amplifiers" may be able to handle transients, e.g. dropping some channels, while causing no effect on remaining channels.

Figure 7:
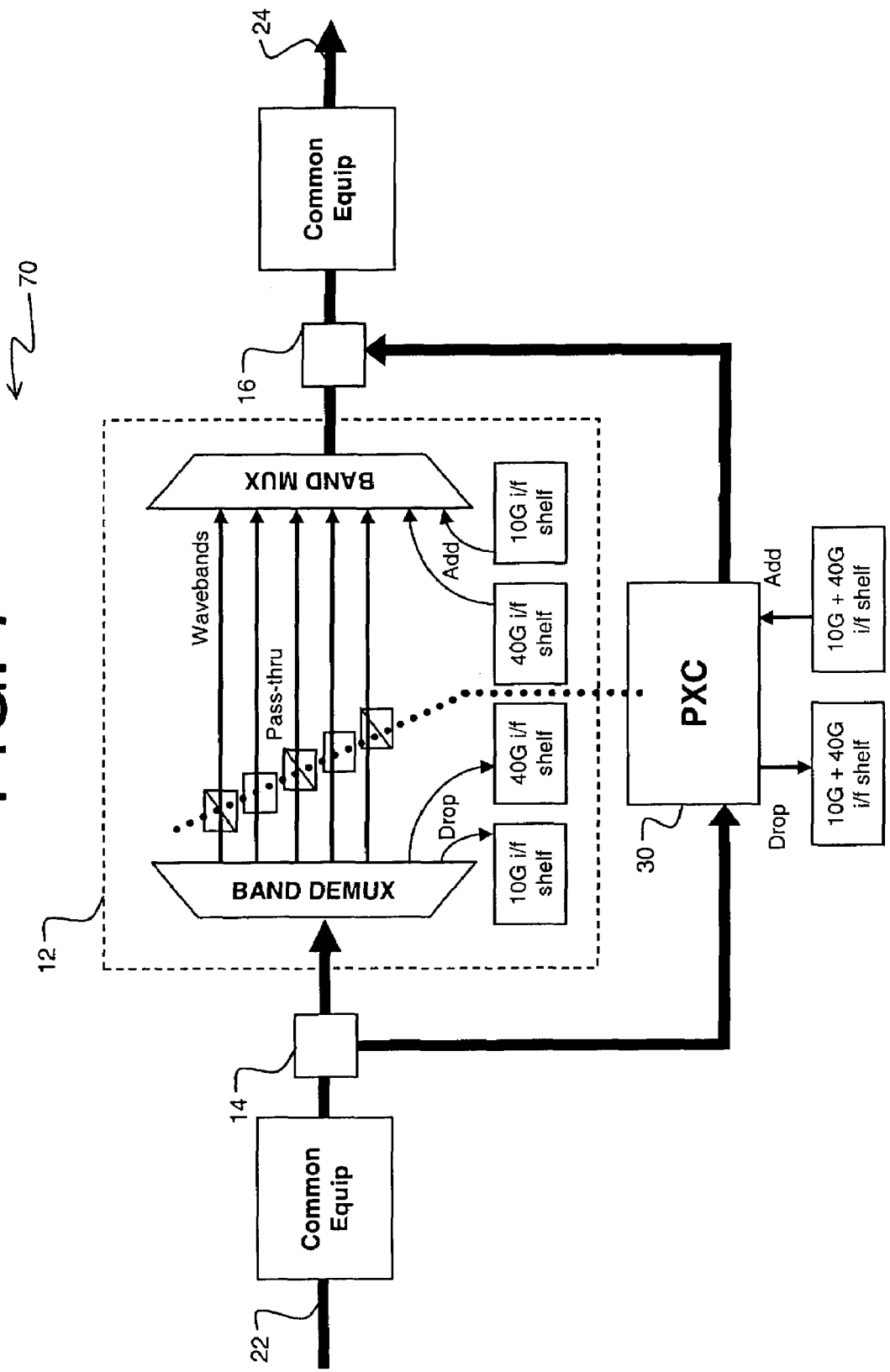

In an alternative embodiment, a plurality of open/closed switches 72 are inserted into the static connections of the fixed optical add/drop multiplexer 12 as shown in FIG. 7. In this embodiment, the corresponding switches open the waveband path, thereby enabling all static connections in the waveband to pass through the photonic switch 30. Unused bandwidth in this waveband can then be used for agile connections. Although simpler than the approach described above, this approach causes a brief disruption to all of the connections, not just those being rolled. This approach does not support the option of slowly ramping down the power in the static waveband that is to be rolled to the photonic switch 30. Again, the severity depends on the behavior of the downstream optical network. However, the downstream optical network may be able to handle the resulting transients without disrupting the other connections.

Figure 8:
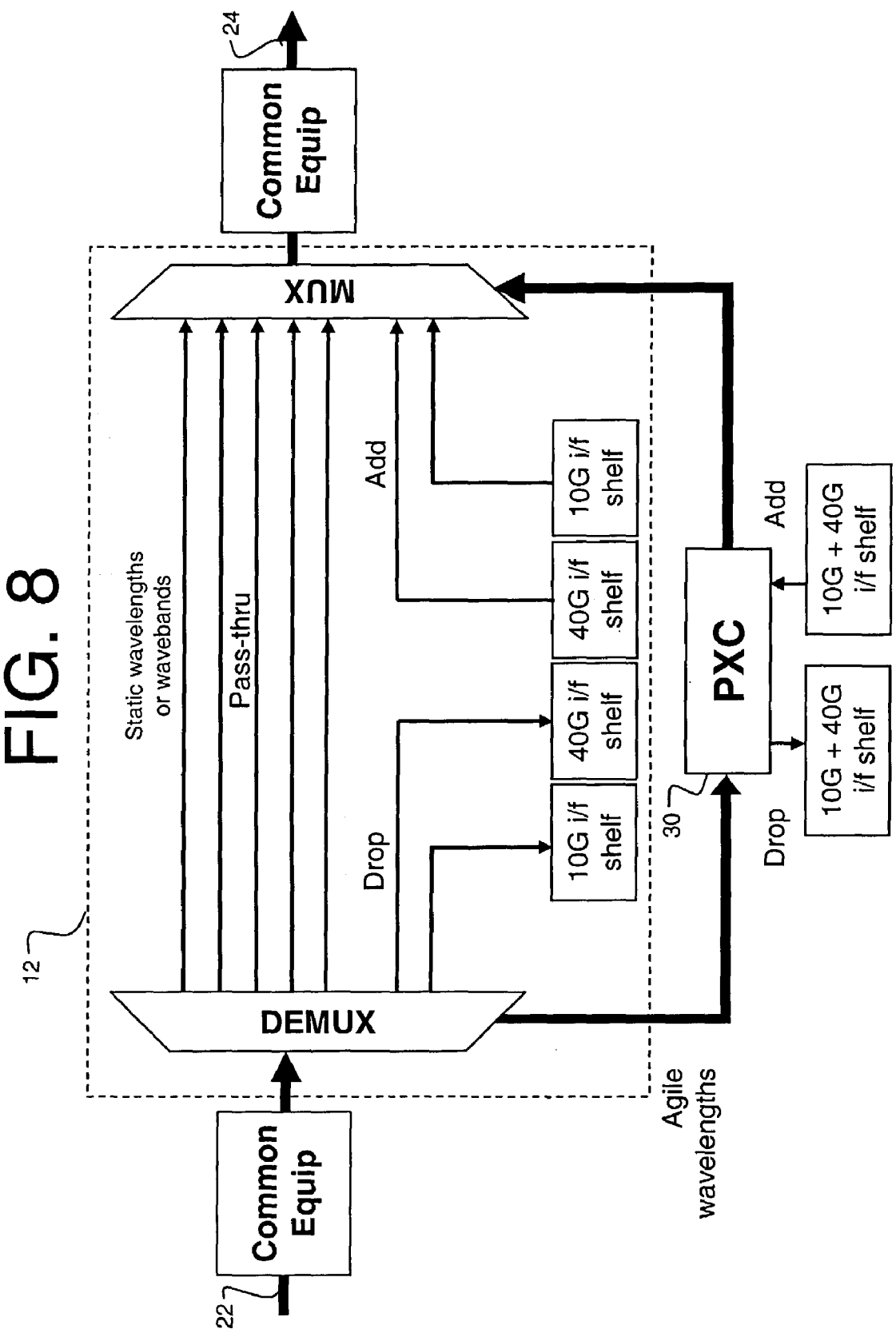
FIG. 8 is a block diagram illustrating a second preferred technique for in-service migration from static optical networking to static plus agile optical networking in accordance with the present invention.

In an alternative approach, static and agile traffic is selected within the demultiplexer as generally shown in FIG. 8.

Figure 9:
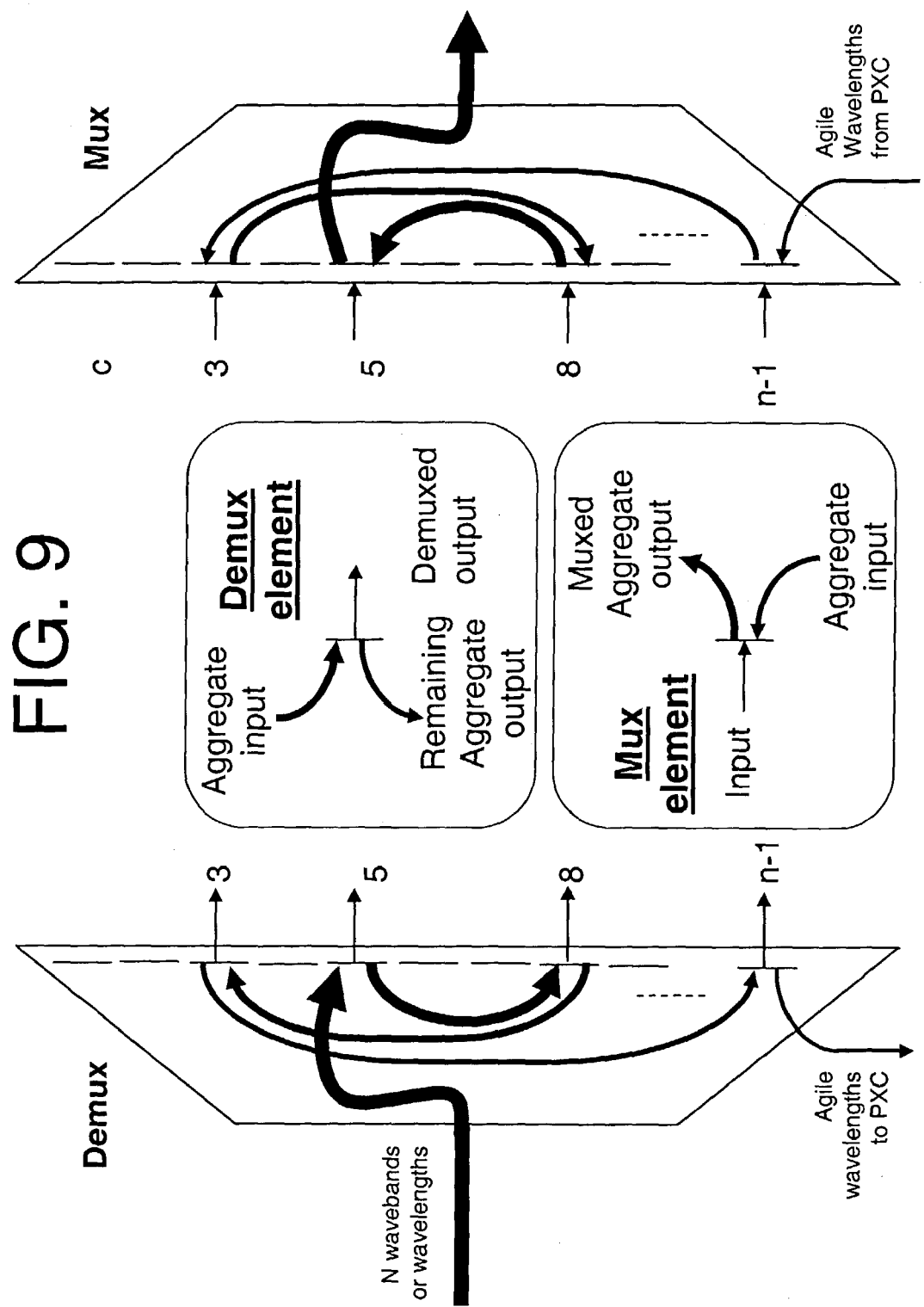
FIG. 9 is a diagram of how network traffic may be statically pre-selected within a demultiplexer and multiplexer of the switching node.

In a first embodiment, static traffic is pre-selected. Referring to FIG. 9, static traffic is passed through to the multiplexer; whereas agile traffic is routed from the demultiplexer to the photonic switch. Pre-selection assumes traffic will not change over time or requires considerable disruption to subsequently alter the nature of the connections.

Figure 10:
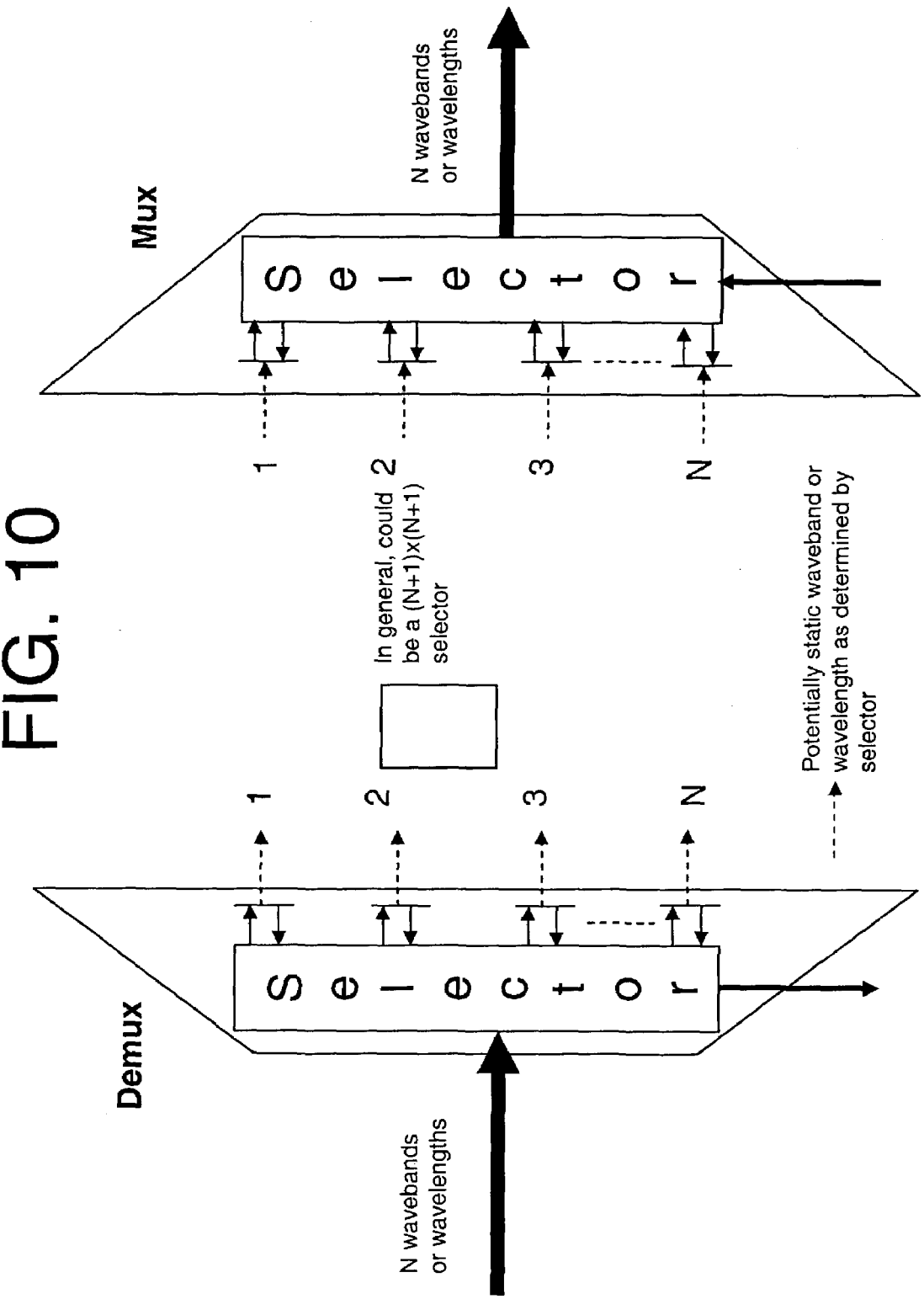
FIG. 10 is a diagram of how network traffic may be flexibly selected within a demultiplexer and multiplexer of the switching node.
Figure 11:
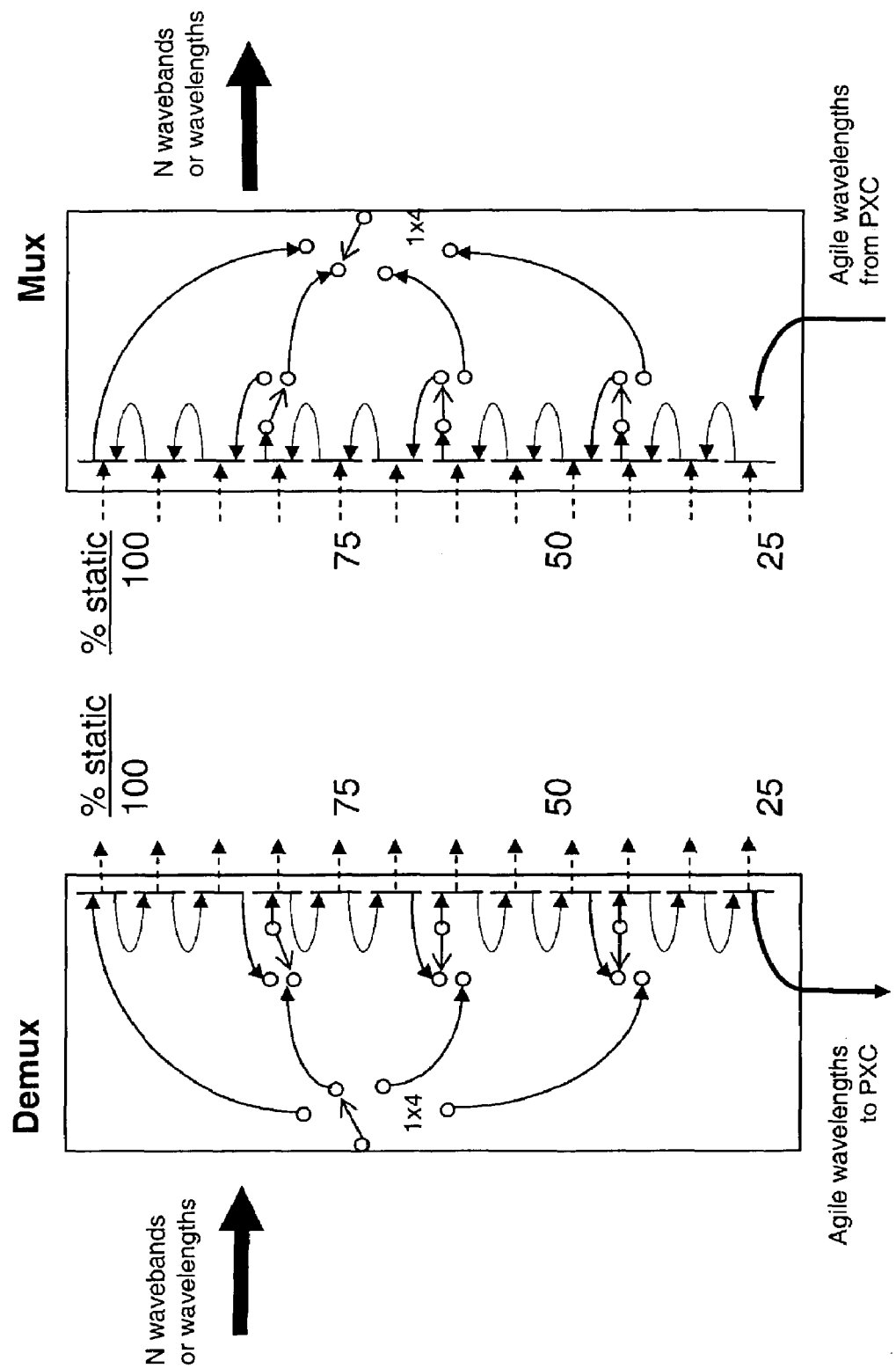
FIG. 11 is a diagram depicting an exemplary selector for a degree of flexibility selecting network traffic in a demultiplexer and multiplexer of the switching node.

In a second embodiment, the allocation of static traffic may be flexibly changed within the demultiplexer as shown in FIG. 10. For instance, a selector is used to flexibly allocate static traffic. Again, static traffic is passed through to the multiplexer; whereas agile traffic is routed from the demultiplexer to the photonic switch. An exemplary selector 90 is depicted in FIG. 11, for a degree of flexible selectivity.

Figure 12A:
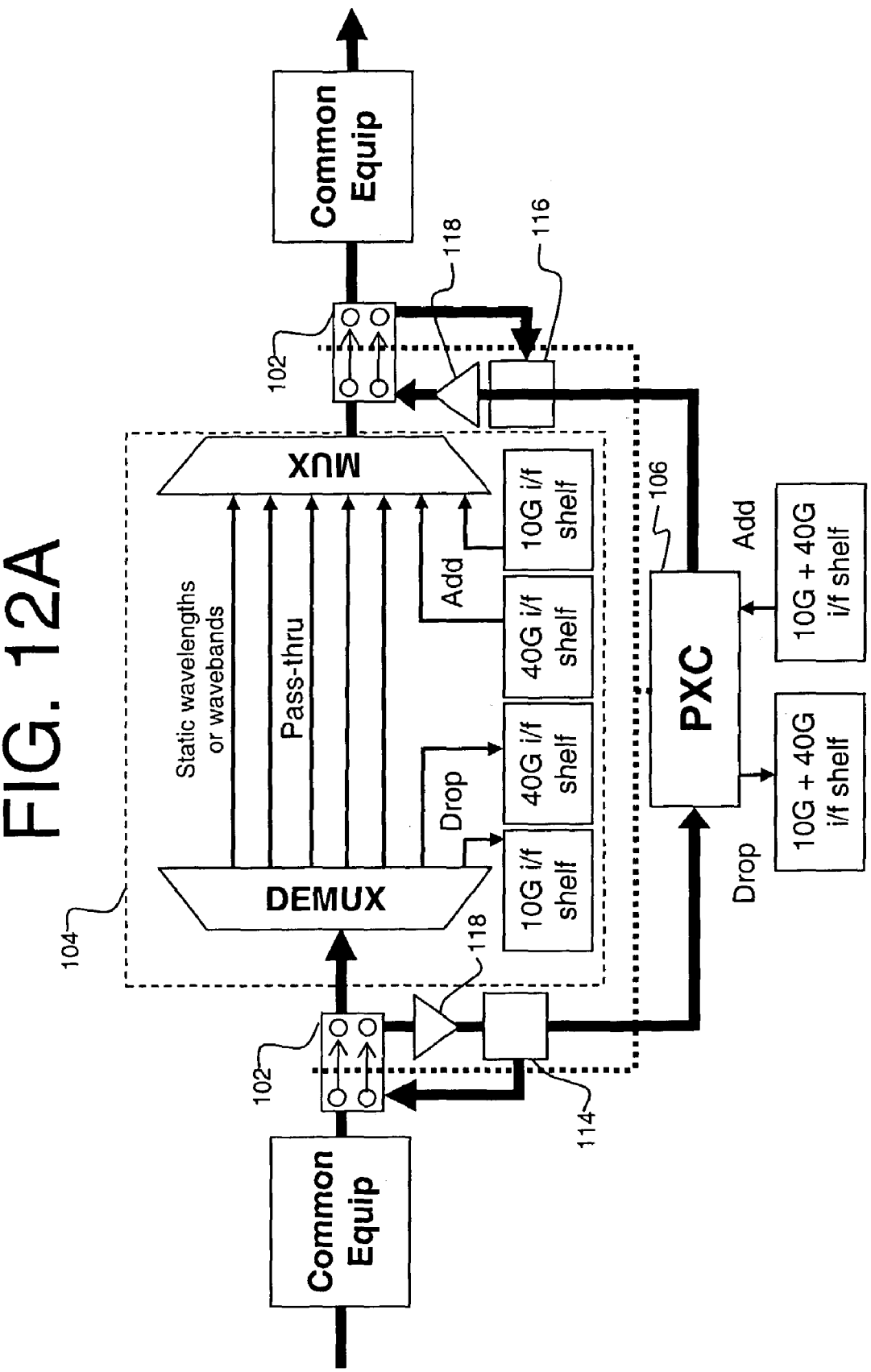
FIGS. 12A and 12B are block diagrams illustrating a third preferred technique for migrating from static optical networking to static plus agile optical networking in accordance with the present invention.
Figure 12B:
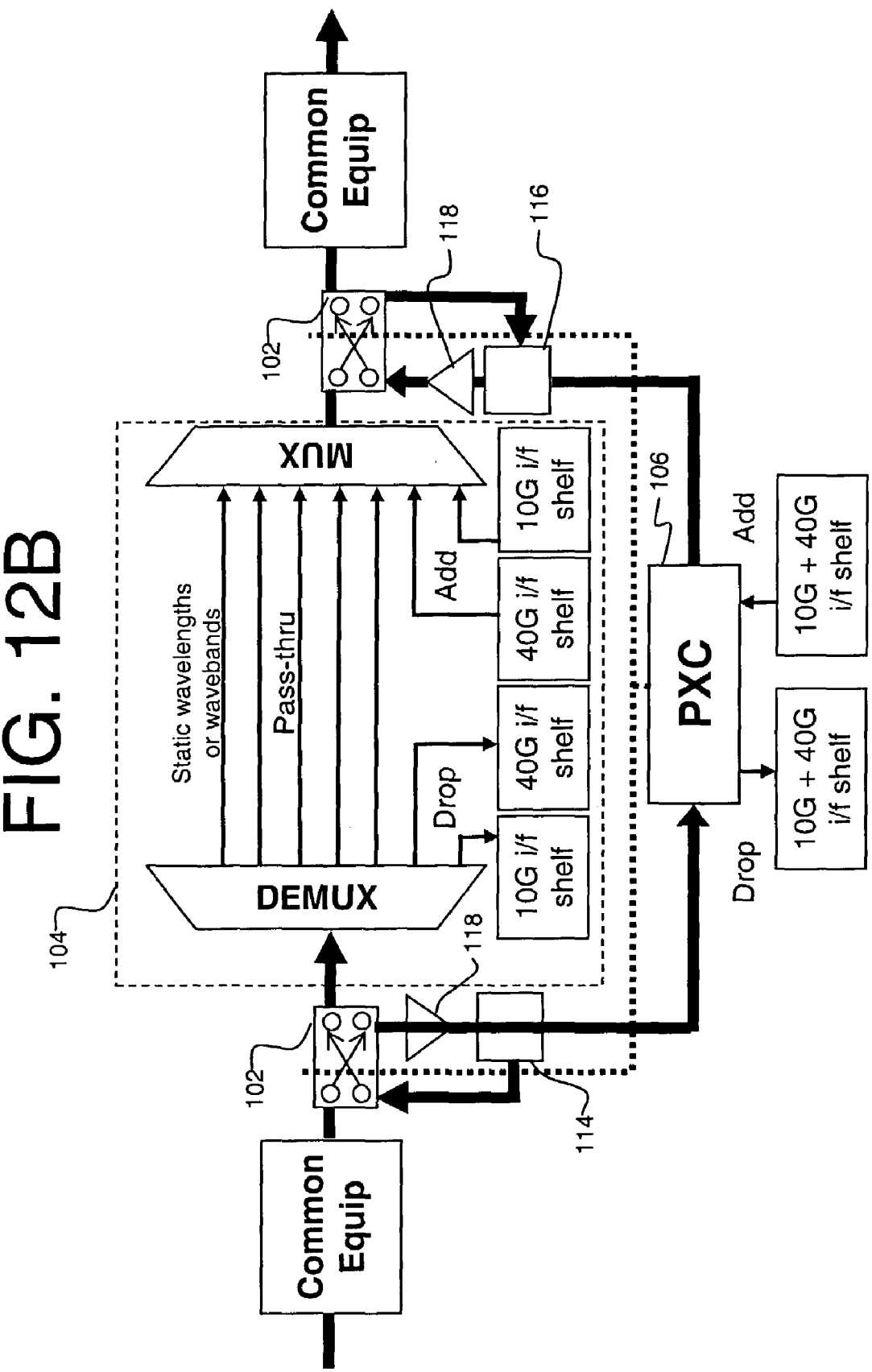

FIGS. 12A and 12B illustrates a service affecting technique for migrating from static optical networking to static plus agile optical networking. In this alternative embodiment, 2×2 switches 102 are located at the input and output of the fixed optical add/drop multiplexer 104. The switches 102 are initially configured to pass through the optical multiplexed signal as shown in FIG. 12A. The fixed optical add/drop multiplexer 104 enables manual connection of static data signals.

A photonic cross-connect switch 106 may be subsequently located between the two switches 102. At introduction, the photonic switch 106 initially blocks all of the data signals and operates the 2×2 switches 102 to a "cross" configuration which routes the optical multiplexed signal towards the photonic switch 106 as shown in FIG. 12B. If required, the photonic switch 106 would also then increase initially low optical amplifier 118 gains to the correct levels, or would enable the amplifier to start amplifying.

On the input side of the node, a signal splitter 114 is located between the 2×2 switch 102 and the photonic switch 106. The signal splitter 114 receives an optical multiplexed signal from the switch 102 and splits it into two optical multiplexed signals. One of the optical multiplexed signals is directed to the photonic switch 106; whereas the other optical multiplexed signal is routed back through the 2×2 switch 102. The photonic switch 106 can switch the agile data signals, thereby enabling agile optical networking. The 2×2 switch 102 also provides a return path for the static signal channels to the fixed optical add/drop multiplexer 104.

On the output side of the node, a signal combiner 116 is located between the 2×2 switch 102 and the photonic switch 106. The signal combiner 116 receives an optical multiplexed signal from the 2×2 switch 102 and the photonic switch 106. The signal combiner 116 in turn combines the two optical multiplexed signals and launches the combined signal into an outgoing optical transport line system.

In the initial static arrangement, the 2×2 switches have less optical loss than the splitter/combiner of the first preferred embodiment. However, existing network traffic is briefly disrupted when the 2×2 switches are operated and the photonic switch is introduced at the node. In addition, when traffic is routed through the photonic switch, the cumulative optical loss of the 2×2 switches 102 in conjunction with the signal splitter 114 and the signal combiner 116 is greater than for the first preferred embodiment. Again, these losses may be cancelled by common equipment amplifiers with negligible optical signal-to-noise ratio (OSNR) impairments.

Furthermore, optical amplifiers 118 may be optionally located between the 2×2 switches and the signal splitters/combiners to compensate for these additional losses. When the 2×2 switches 102 are initially configured in a pass through state, the optical amplifiers may be reduced in gain or disabled to suppress any oscillation in the feedback loop formed between the switch 102 and the signal splitter 114. Lastly, note that static pass-through connections being routed through the photonic switch enables recovery of stranded waveband bandwidth, and recovery of guard bands between adjacent wavebands. The static add and drop wavelengths or wavebands are still maintained.

Figure 13:
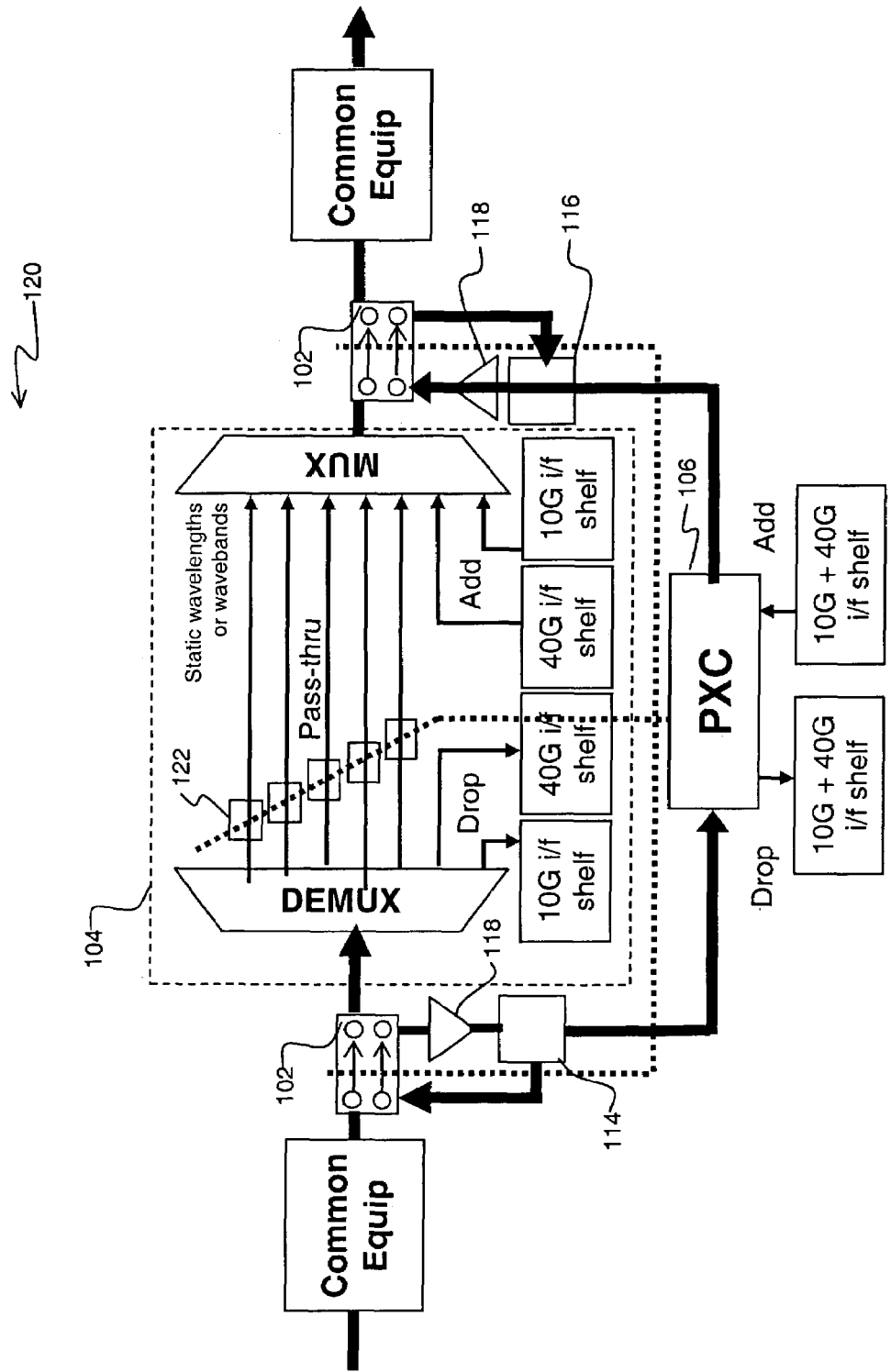
FIG. 13 is a block diagram illustrating how simple open/closed switches may be employed to better isolate static connections through the photonic switch of the switching node in accordance with the present invention.

A variation of this service affecting technique is shown in FIG. 13. A plurality of open/close switches 122 are inserted into the static connections of the fixed optical add/drop multiplexer. In an initial closed state, the switches 122 pass through the static data signals. At introduction, the photonic switch 106 initially blocks all of the data signals and operates the 2×2 switches 102 as described above. The photonic switch 106 may also open certain of the switches 122 residing in the fixed optical add/drop multiplexer. This enables corresponding static connections to be enabled through the photonic switch 106.

After the photonic switch has been introduced, the switches and pass-through patch cords for the operated switches 122 can be removed from the node. As a result, there is no possibility of interference between static and agile connections and any noise in unused static channels is prevented from combining with corresponding agile connections at the signal combiner 116. Lastly, note again that static pass-through connections being routed through the photonic switch enables recovery of stranded waveband bandwidth, and recovery of guard bands between adjacent wavebands. The static add and drop wavelengths or wavebands are still maintained.

Figure 14A:
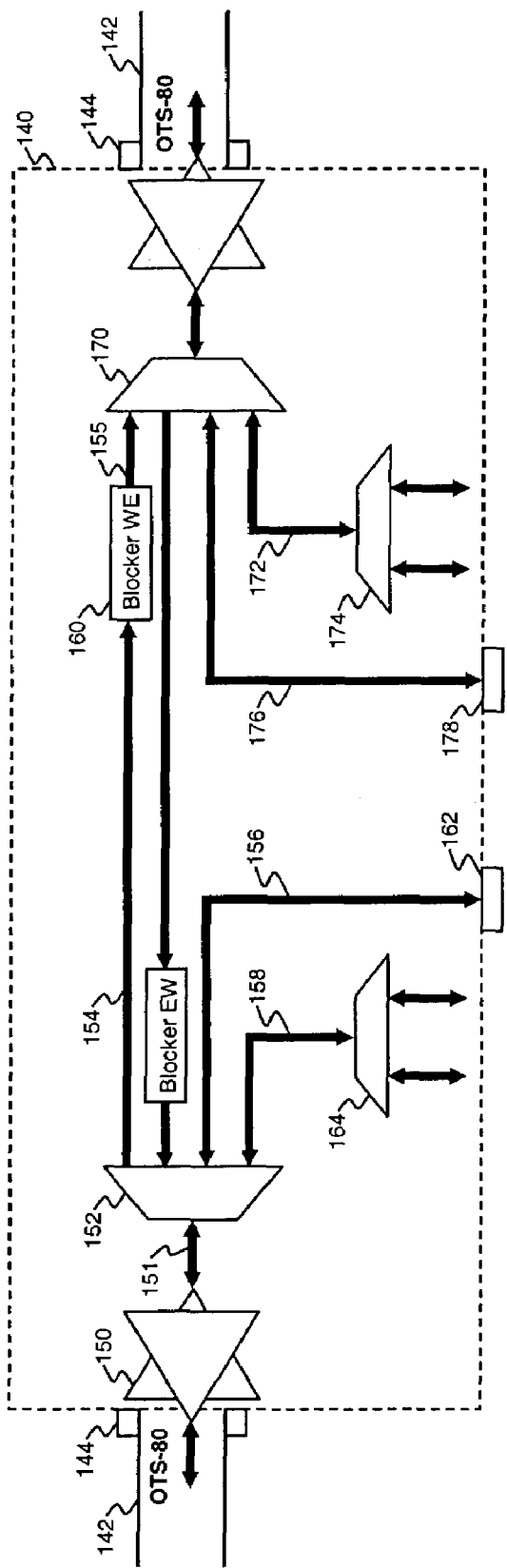
FIGS. 14A-14C are block diagrams illustrating an exemplary technique for migration from a scaleable OADM to a network switching node in accordance with the present invention.
Figure 14B:
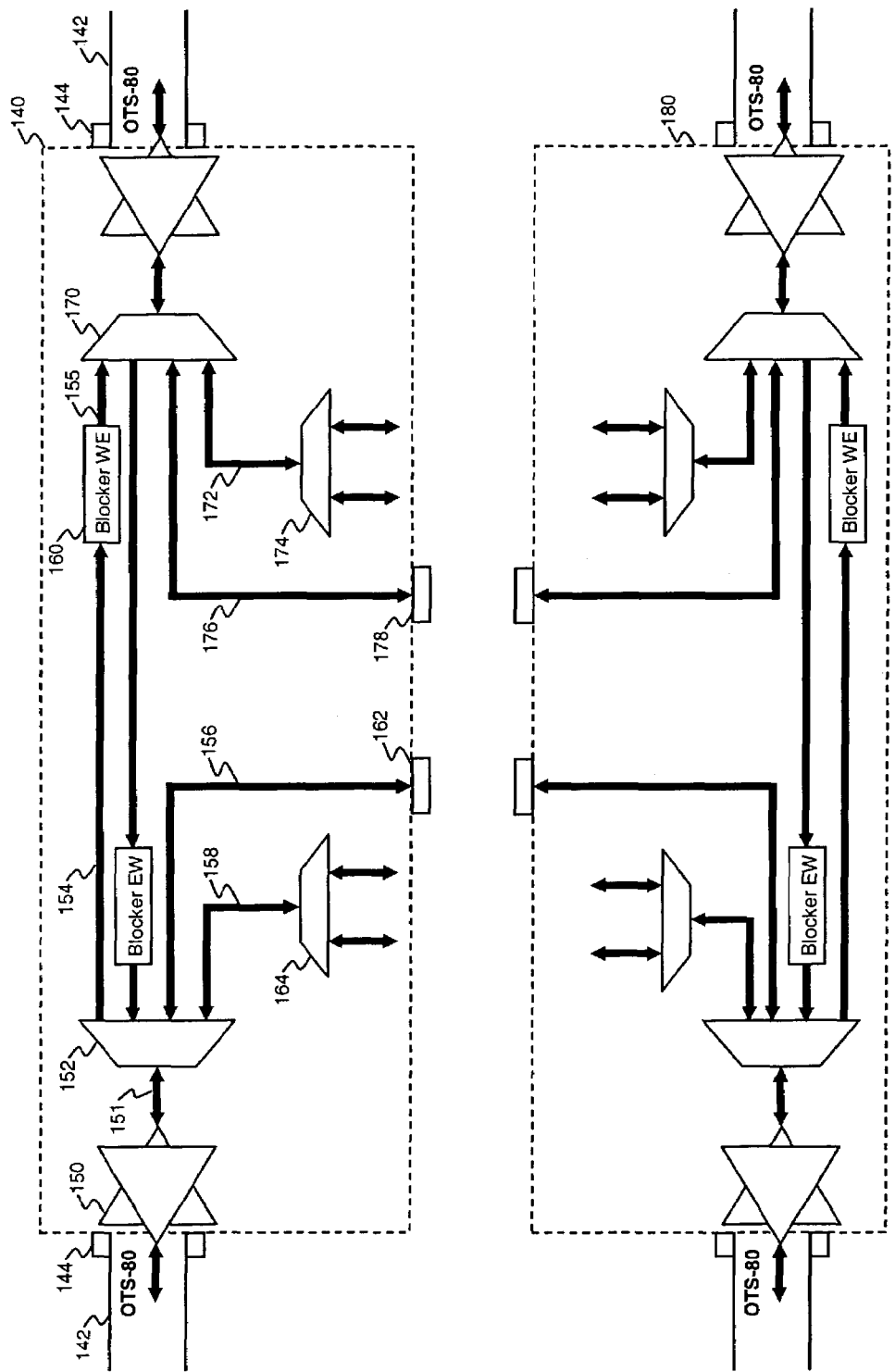
Figure 14C:
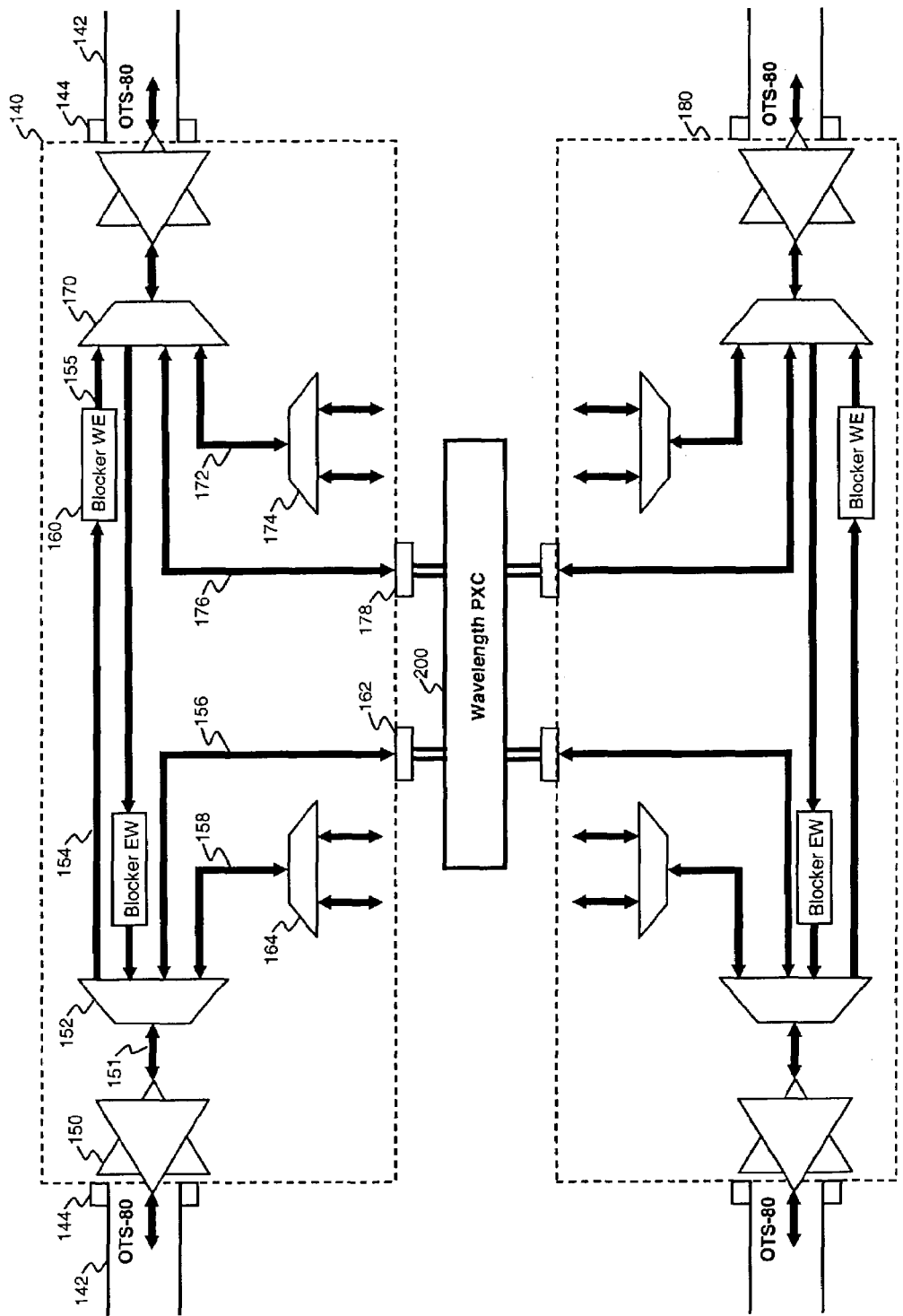

In another aspect of the present invention, a seamless technique for migration from a scaleable and reconfigurable optical add/drop multiplexer to a network switching node is depicted in FIGS. 14A-14C. The migration is enabled by a scaleable and reconfigurable optical add/drop multiplexer (OADM) which is pre-deployed in an optical transport network. An exemplary scaleable OADM 140 is shown in FIG. 14A. However, it is envisioned that other configurations for the scaleable OADM 140 are within the broader aspects of the present invention.

The scaleable OADM 140 is configured to support two optical transport lines 142. Each optical transport line carries two optical multiplexed signals traversing in opposite directions, where each optical multiplexed signal embodies a plurality of optical data signals as discussed above. The scaleable OADM 140 in turn provides an inlet port 144 for connecting to each of the optical transport lines 142.

An optical signal splitter/combiner 152 is connected to each inlet port 144, such that each optical signal splitter/combiner 152 receives an incoming optical multiplexed signal. The optical signal splitter/combiner 152 is operable to split the incoming optical multiplexed signal into at least two partitioned multiplexed signals: a pass-thru multiplexed signal 154 and an outgoing routable multiplexed signal 156. The optical signal splitter/combiner 152 may further split the optical transport signal into a third local drop multiplexed signal 158. It is envisioned that an optical amplifier 150, which may optionally provide dispersion compensation, may be interposed between the inlet port 144 and the optical signal splitter/combiner 152, thereby amplifying the incoming optical multiplexed signal 151 prior to it being partitioned by the optical signal splitter/combiner 152.

A wavelength selective device 160 is adapted to receive the pass-thru multiplexed signal from the optical signal splitter/combiner 152. Wavelength selective devices are generally operable to manipulate the optical data signals embodied in optical multiplexed signals. In other words, wavelength selective devices can be characterized as devices that operate on data signals transmissible at two or more wavelengths. Such devices are commercially available from various optical component manufacturers, including Corning, JDS Uniphase, Network Photonics, and Avanex. In particular, the wavelength selective device may be further defined as a wavelength selective blocker as shown in FIG. 14A. The wavelength selective blocker is operable to at least one of pass thru or block each data signal embodied in the pass-thru multiplexed signal 154.

An upgrade outlet port 162 is adapted to receive the routable multiplexed signal 156 from the optical signal splitter/combiner 152. In a pre-deployed condition, the routable multiplexed signal 156 is terminated at the upgrade outlet port 162. However, the upgrade outlet port 162 provides a means for routing the routable multiplexed signal 156 to a photonic switch at some later time. As will be further described below, configuring the OADM 140 with upgrade inlet and outlet ports enables the migration to a network switching node.

An optical multiplexer/demultiplexer 164 is adapted to receive the local drop multiplexed signal 158 from the optical signal splitter/combiner 152. The optical multiplexer/demultiplexer 164 is operable to separate the local drop multiplexed signal 158 into the plurality of optical data signals therein (either wavelengths or sub-bands). The optical data signals may in turn be routed to client interface equipment (not shown) as is well known in the art. It is readily understood that the optical data signals may be routed using fiber connections to other types of network components. To the extent that the local drop multiplexed signal 158 is an optical band signal, it is also understood that cascading demultiplexers may be needed to achieve optical wavelength signals that are applicable for routing to client interface equipment. One skilled in the art will readily recognize that the splitter function performed by the optical signal splitter/combiner 152 and the demultiplexing function performed by the multiplexer/demultiplexer 164 may be combined into a single optical component.

An optical signal splitter/combiner 170 is adapted to receive the pass-thru multiplexed signal 155 from the wavelength selective device 160 as well as a local add multiplexed signal 172. The local add multiplexed signal 172 is received from an optical multiplexer/demultiplexer 174, where the optical multiplexer/demultiplexer 174 is adapted to receive client data signals from local client interface equipment as is well known in the art. The optical multiplexer/demultiplexer 174 operates to combine the client data signals into the local add multiplexed signal 172. The optical signal splitter/combiner 170 in turn operates to combine the pass-thru multiplexed signal 154 with the local add multiplexed signal 174.

The optical signal splitter/combiner is also adapted to receive an incoming routable multiplexed signal 176. The incoming routable multiplexed signal 176 is received via an upgrade inlet port 178 to the scaleable OADM 140. In a pre-deployed condition, the upgrade inlet port 178 does not receive such a signal. However, the upgrade inlet port 178 provides a means for connecting to a photonic switch at some later time. It is envisioned that the optical signal splitter/combiner may include a variable optical attenuator to manage the power level of the incoming signal 176.

In the pre-deployed condition, the scaleable and reconfigurable OADM 140 operates in a conventional manner. Specifically, the wavelength selective devices 160 and the client interface equipment cooperatively operate to route optical data signals through the scaleable and reconfigurable OADM 140. For instance, each of the optical data signals embodied in the incoming optical multiplexed signal 151 may be passed through the network site or may be dropped to the local client interface equipment. For simplicity only one direction of transmission is described above. However, it is readily understood that the scaleable OADM 140 is configured to support bi-directional traffic. For instance, the scaleable OADM 140 is configured with four upgrade ports: an upgrade inlet port for each direction and an upgrade outlet port for each direction.

The scaleable OADM 140 may be pre-deployed at a network node in the optical transport network. To migrate to a network switching node, a second optical add/drop multiplexer (OADM) 180 is first introduced at the network node as shown in FIG. 14B. This second OADM 180 is configured the same as the scaleable OADM 140 described above.

Referring to FIG. 14C, the pre-deployed OADM 140 is then interconnected via a photonic cross-connect switch 200 to the second OADM 180. It is envisioned that the photonic cross-connect switch 200 may be incorporated into the network node contemporaneously with or subsequent to the second OADM 180. In operation, the photonic cross-connect switch 200 is operable to route optical data signals amongst the various optical transport lines supported by the OADMs. While the following description is provided with reference to a particular photonic cross-connect switch 200, it is readily understood that other photonic cross-connect switches are also within the scope of the present invention. Further implementation details for some exemplary photonic cross-connect switches are disclosed in U.S. application Ser. No. 10/051,234 filed on Jan. 18, 2002 which is assigned to the assignee of the present invention and incorporated herein by reference.

Figure 15:
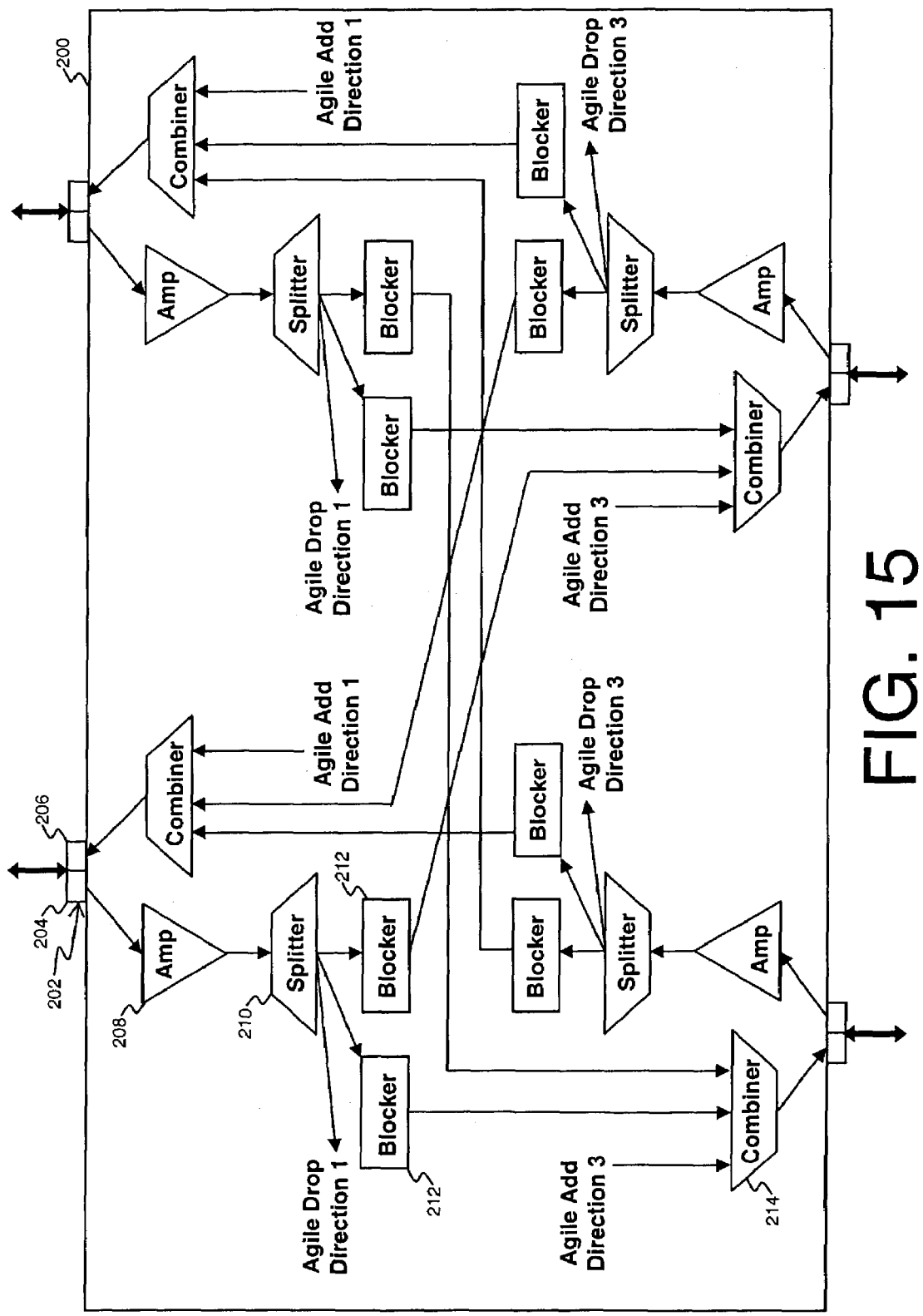
FIG. 15 is a block diagram of an exemplary optimized photonic cross-connect switch in accordance with the present invention.

An exemplary optimized photonic cross-connect switch 200 is further described in relation to FIG. 15. The optimized photonic cross-connect switch 200 is configured to support optical multiplexed signals traversing in four different directions. The optimized photonic cross-connect switch 200 specifically provides four connection ports 202, such that each connection port is connected by an optical transport line to one of the upgrade ports of the OADMs. To support bi-directional traffic, it is readily understood that each connection port 202 is further defined to include an inlet port 204 and an outlet port 206. Such ports will be herein referred to as "complementary ports". It is further understood that the cross-connect switch 200 may be designed to support more or less than four connection ports.

A signal splitter 210 is connected to each of the inlet ports 204. Each signal splitter 210 is adapted to receive an incoming routable multiplexed signal and operable to partition the incoming multiplexed signal into two or more partitioned multiplexed signals. The partitioned multiplexed signals output by each signal splitter 210 are in turn routed to different outlet ports 206 of the switch 200. To maintain adequate signal strength, it is envisioned that an optical amplifier 208 may be interposed between each inlet port 204 and its corresponding signal splitter 210.

To accommodate routing of partitioned optical multiplexed signals through the switch, wavelength selective devices 212 are interposed between the signal splitters 210 and the outlet ports 206. As described above, each wavelength selective device is operable at different wavelengths to manipulate optical data signals embodied in the partitioned optical multiplexed signals. Although the invention is not limited thereto, each wavelength selective device is shown as a wavelength selective blocker in FIG. 15 but could also be an integrated 1×N wavelength switch (1×2 in this example) that replaces a combiner and associated blockers.

Output from the wavelength selective devices 212 is then routed through a signal combiner 214 that is disposed at each outlet port 206 of the switch. With the exception of its complementary inlet port, each signal combiner 214 may be adapted to receive a partitioned multiplexed signal from each of the other inlet ports. However, since an optical multiplexed signal may be passed through its corresponding OADM, there is no need to route these signals through the cross-connect switch 200. Thus, in a preferred optimized arrangement, each signal combiner 214 only receives partitioned multiplexed signals from inlet ports which are connected to OADMs other than the OADM to which its output is connected as shown in FIG. 15. In either arrangement, the signal combiner 214 is in turn operable to combine partitioned multiplexed signals into an outgoing routable multiplexed signal. In addition, it is envisioned that one or more of the signal splitters 210 and/or signal combiners 214 may be operable to partition and combine, respectively, one additional multiplexed signal, thereby optionally supporting signal add/drop functionality through the PXC as shown in FIG. 15.

In operation, the photonic cross-connect switch 200 is operable to route optical data signals amongst the various optical transport lines supported by the OADMs. More specifically, the wavelength selective devices of the cross-connect switch, the wavelength selective devices of the OADMs and client interface equipment cooperatively operate to route optical data signals through the network switching node. In this way, the pre-deployed optical add/drop multiplexer has been migrated to a network switching node.

Figure 16:
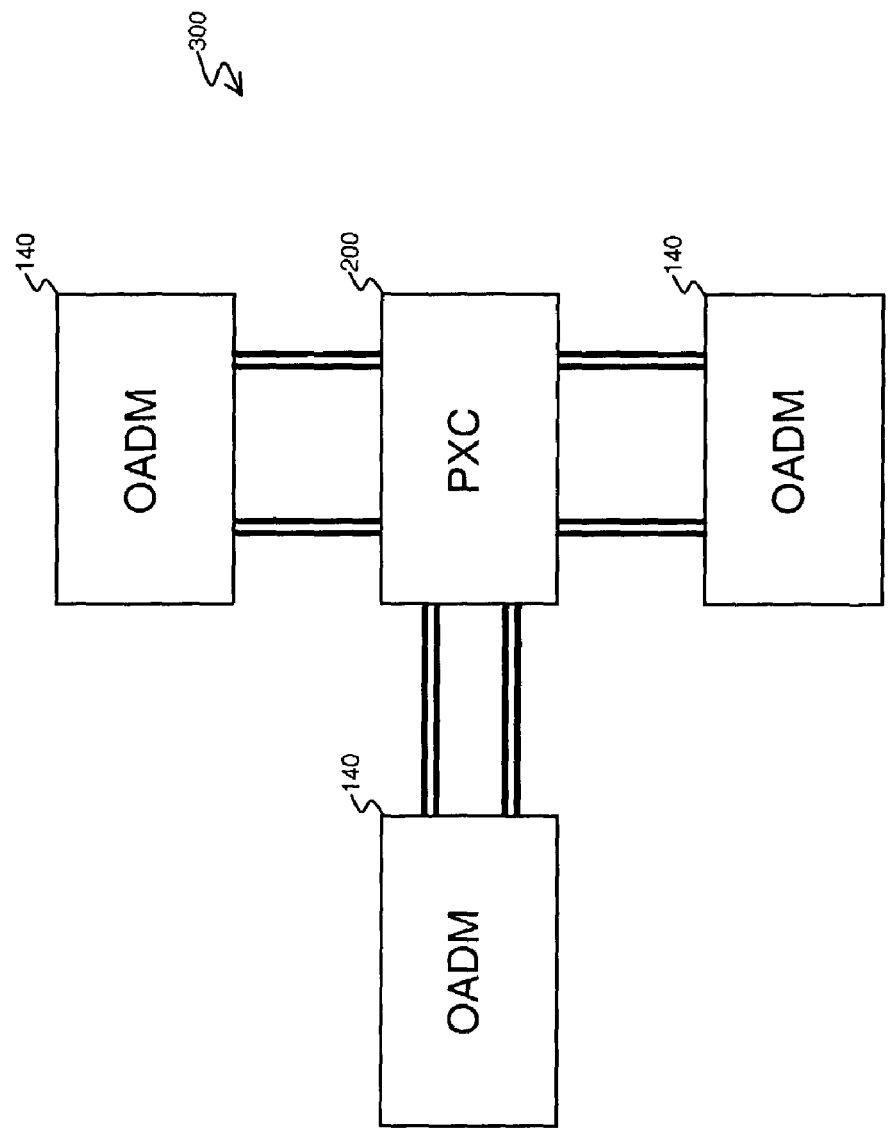
FIG. 16 is a block diagram of an exemplary upgraded network switching node having three scaleable OADMs interconnected by a phonotic cross-connect switch.

While the above description has been provided with reference to two OADMs, it is readily understood that the network node may be scaleable to network switching node having more than two OADMs. FIG. 16 illustrates an exemplary configuration of an upgraded network switching node 300 having three scaleable and reconfigurable OADMs 140 interconnected by a phonotic cross-connect switch 200. In this example, it is further understood that the cross-connect switch 200 may be designed to support six connection ports. While the invention has been described in its presently preferred form, it will be understood that the invention is capable of modification without departing from the spirit of the invention as set forth in the appended claims.

What is claimed is:

1. A method for seamless migration from a scaleable optical add/drop multiplexer to a network switching node in an optical transport network, comprising:

providing a pre-deployed optical add/drop multiplexer (OADM) at a network node in the optical transport network, the pre-deployed OADM configured to support at least two optical transport lines;

introducing an added optical add/drop multiplexer (OADM) at the network node, the added OADM configured to support at least two optical transport lines; and interconnecting the pre-deployed OADM to the added OADM using a photonic cross-connect switch, where the photonic cross-connect switch is operable to route optical signals amongst the optical transport lines connected to the pre-deployed OADM and the added OADM;

configuring each of the pre-deployed OADM and the added OADM with at least one upgrade inlet port and at least one upgrade outlet port, such that the photonic cross-connect switch is connected via the upgrade inlet ports and the upgrade outlet ports to the pre-deployed OADM and the added OADM;

receiving an optical multiplexed signal at a first port of the pre-deployed OADM, the optical multiplexed signal having a plurality of data signals embodied therein;

splitting the optical multiplexed signal into a pass-thru multiplexed signal and an outgoing routable multiplexed signal; and routing the outgoing routable multiplexed signal via an upgrade outlet port to the photonic cross-connect switch.

2. The method of claim 1 further comprises routing the pass-thru multiplexed signal through a wavelength selective device to a second port of the pre-deployed OADM, the wavelength selective device being operable at different wavelengths to manipulate optical data signals embodied in the pas-thru multiplexed signal.

3. The method of claim 1 further comprises routing the outgoing routable multiplexed signal via the photonic cross-connect switch to one of the optical transport lines supported by the added OADM.

4. The method of claim 3 wherein routing the outgoing routable multiplexed signal further comprises
receiving the outgoing routable multiplexed signal at an inlet port of the photonic cross-connect switch;
splitting the outgoing routable multiplexed signal into at least two further partitioned multiplexed signals;
separately routing each of the further partitioned multiplexed signals through a wavelength selective device to an outlet port of the photonic cross-connect switch, where the wavelength selective devices are operable at different wavelengths to manipulate optical data signals embodied in the further partitioned multiplexed signals and the outlet ports are connected to the added OADM.

5. The method of claim 4 further comprises amplifying the outgoing routable multiplexed signal prior to splitting the second partitioned multiplexed signal.

6. The method of claim 4 wherein the wavelength selective devices of the photonic cross-connect switch cooperatively operate to route the further partitioned multiplexed signals amongst the outlet ports of the photonic cross-connect switch.

7. The method of claim 1 further comprises splitting the optical multiplexed signal into a third local drop multiplexed signal; and routing the third local drop multiplexed signal to a demultiplexer, thereby providing signal drop capability.

* * * * *